United States Patent [19]

Huber

[11] Patent Number: 5,107,379
[45] Date of Patent: Apr. 21, 1992

[54] READ CHANNEL DETECTOR WITH IMPROVED SIGNALING SPEED

[75] Inventor: William D. Huber, San Jose, Calif.

[73] Assignee: Maxtor Corporation, San Jose, Calif.

[21] Appl. No.: 541,582

[22] Filed: Jun. 21, 1990

Related U.S. Application Data

[63] Continuation-in-part of Ser. No. 301,515, Jan. 24, 1989, Pat. No. 4,953,041.

[51] Int. Cl.⁵ .......................... G11B 5/09; G11B 5/02
[52] U.S. Cl. .......................................... 360/46; 360/67
[58] Field of Search ...................... 360/45, 46, 51, 65, 360/67

[56] References Cited

U.S. PATENT DOCUMENTS 4,595,959 6/1986 Bailey ..................................... 360/67

Primary Examiner—Vincent P. Canney
Attorney, Agent, or Firm—Blakely, Sokoloff, Taylor & Zafman

[57] ABSTRACT

A read channel detector circuit for recovery of digital data from a readback waveform produced by a magnetic recording head is disclosed. The detector circuit includes a forward filter for slimming the rising edge and slurring the falling edge of an isolated input magnetic pulse. Quantized feedback techniques are then used to produce a compensating waveform which is substantially complimentary to the portion of the filtered waveform occurring after $T_{min}$. The complimentary waveform is then added to the forward filter output to produce a waveform which is substantially a step function. This step function corresponds to a single digital transition, either positive-going or negative-going in a digital output sequence. The equalized waveform is then limited by a comparator to produce the desired digital output sequence. By slimming only the rising edge of the input magnetic pulse and by using quantized feedback techniques, the overall bandwidth of the system is conserved resulting in an increased binary signalling capability without substantial intersymbol interference.

4 Claims, 10 Drawing Sheets

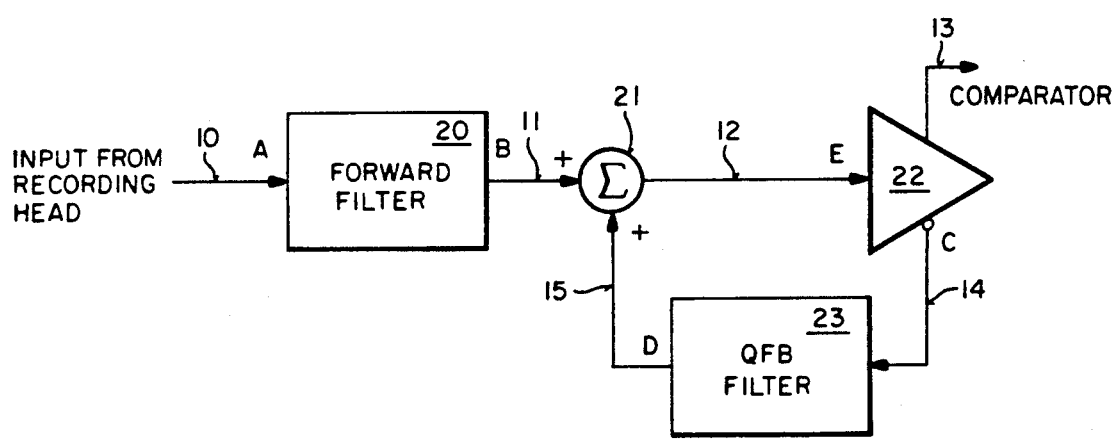
FIG_1
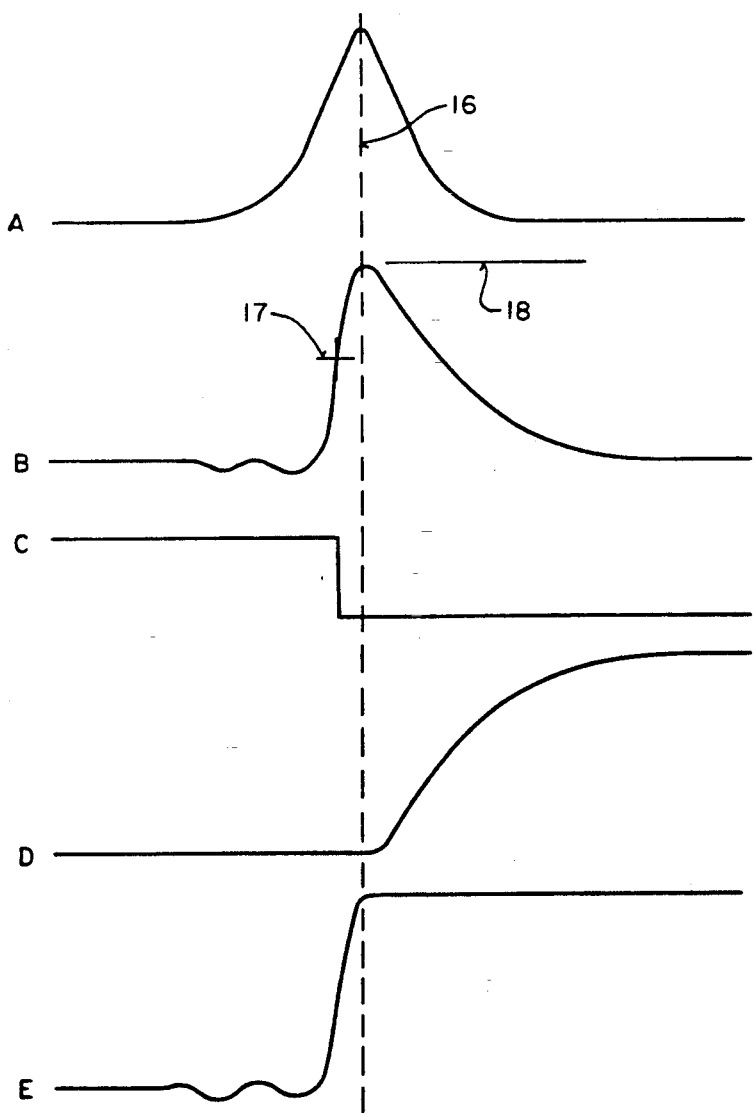
FIG_2

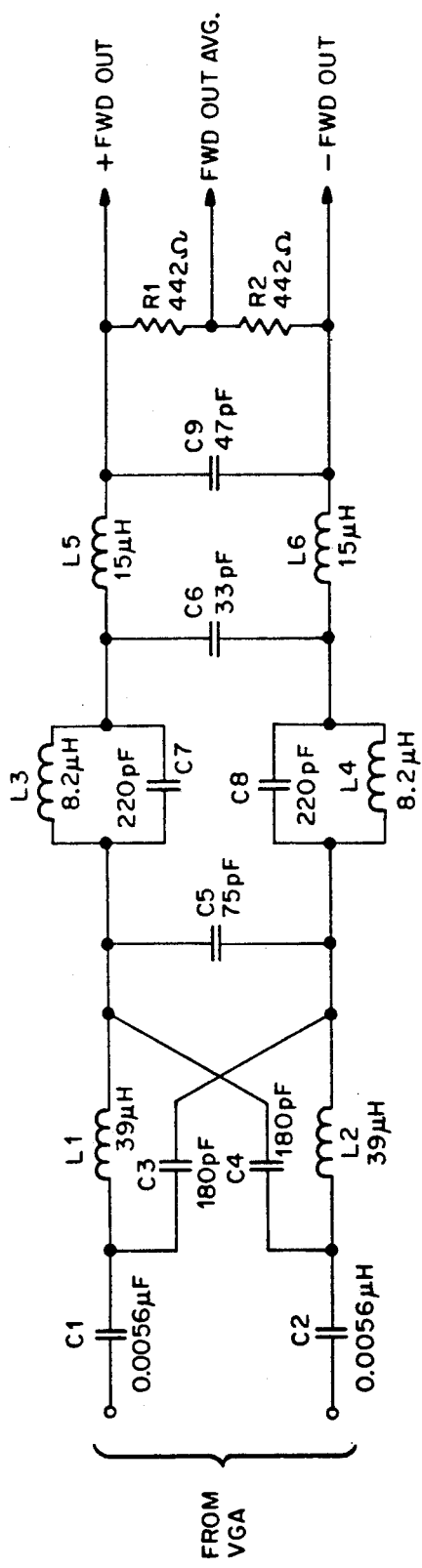
FIG_4
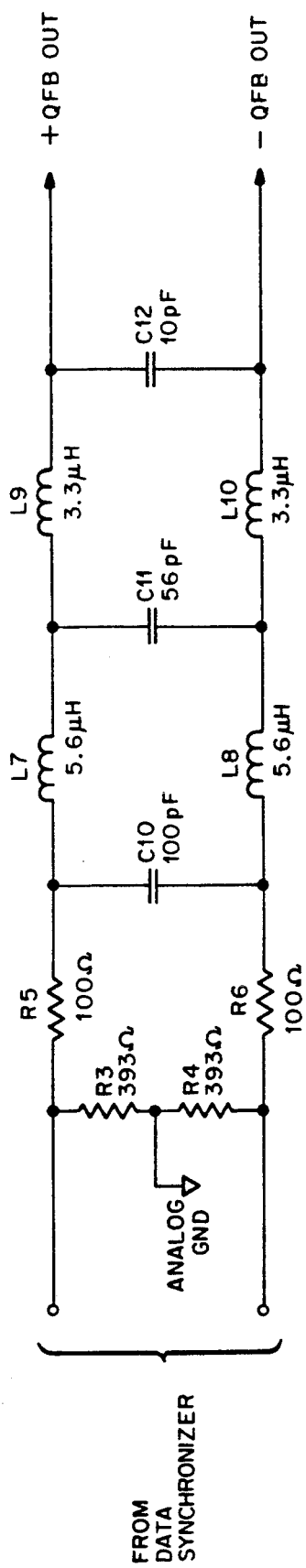
FIG_5

FIG_7A
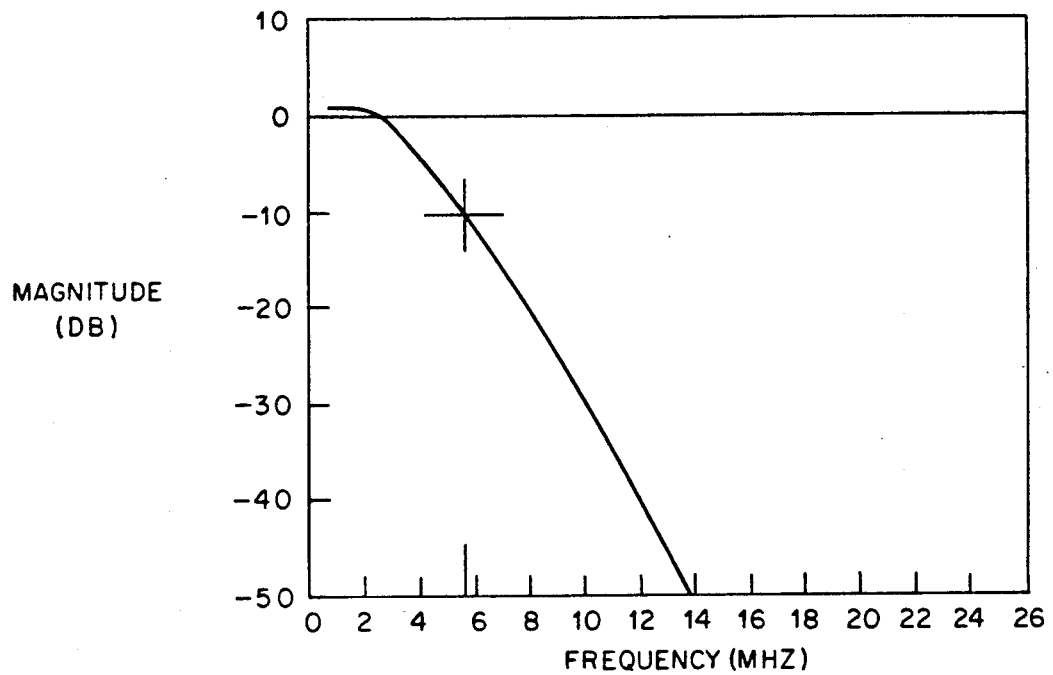
FIG_7B
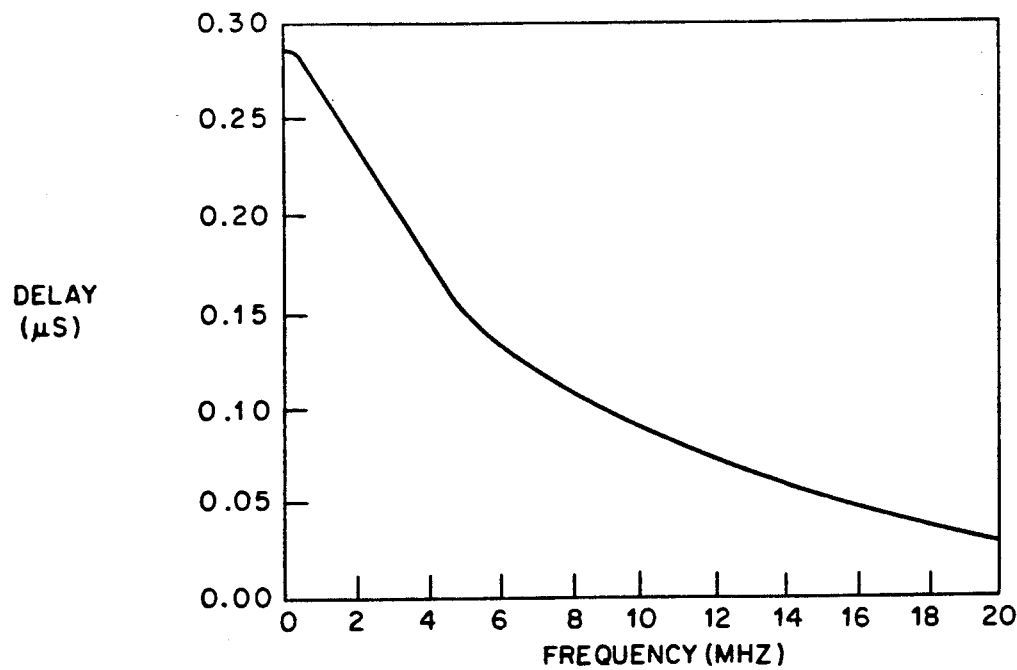

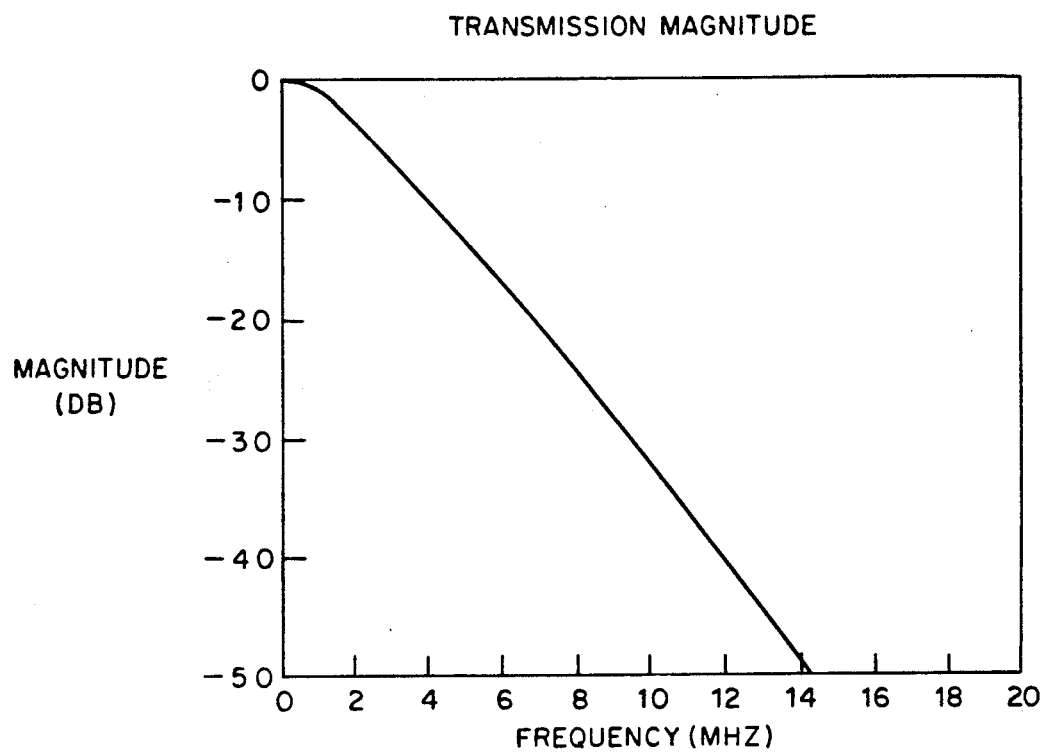
FIG_8A
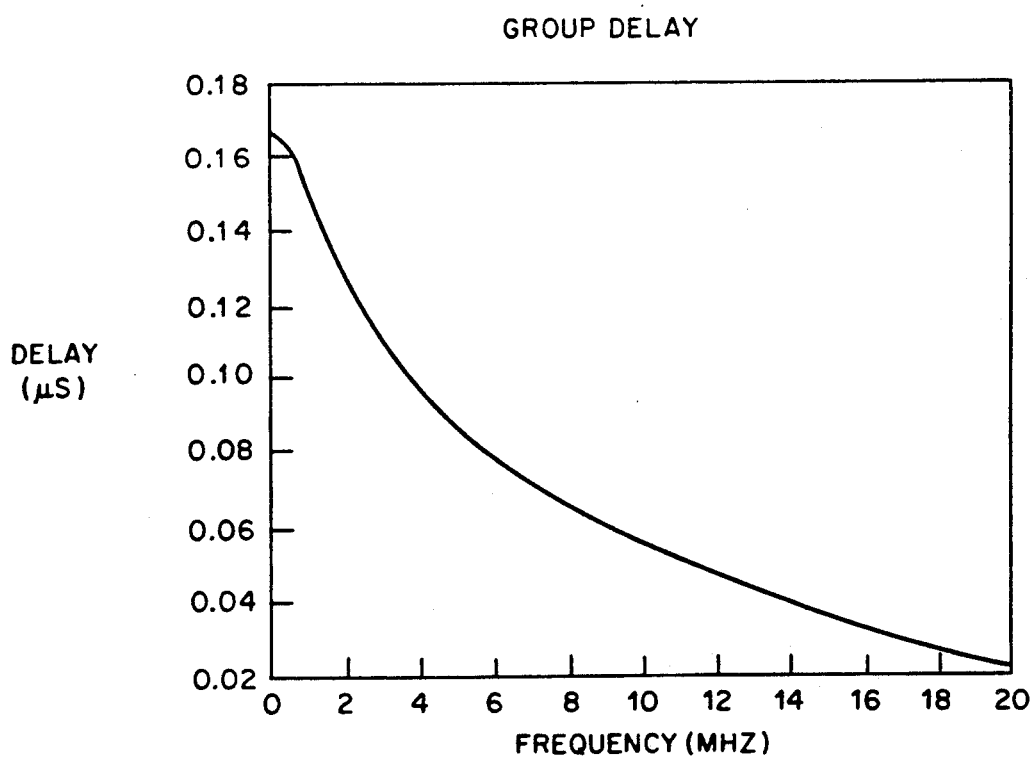
FIG_8B

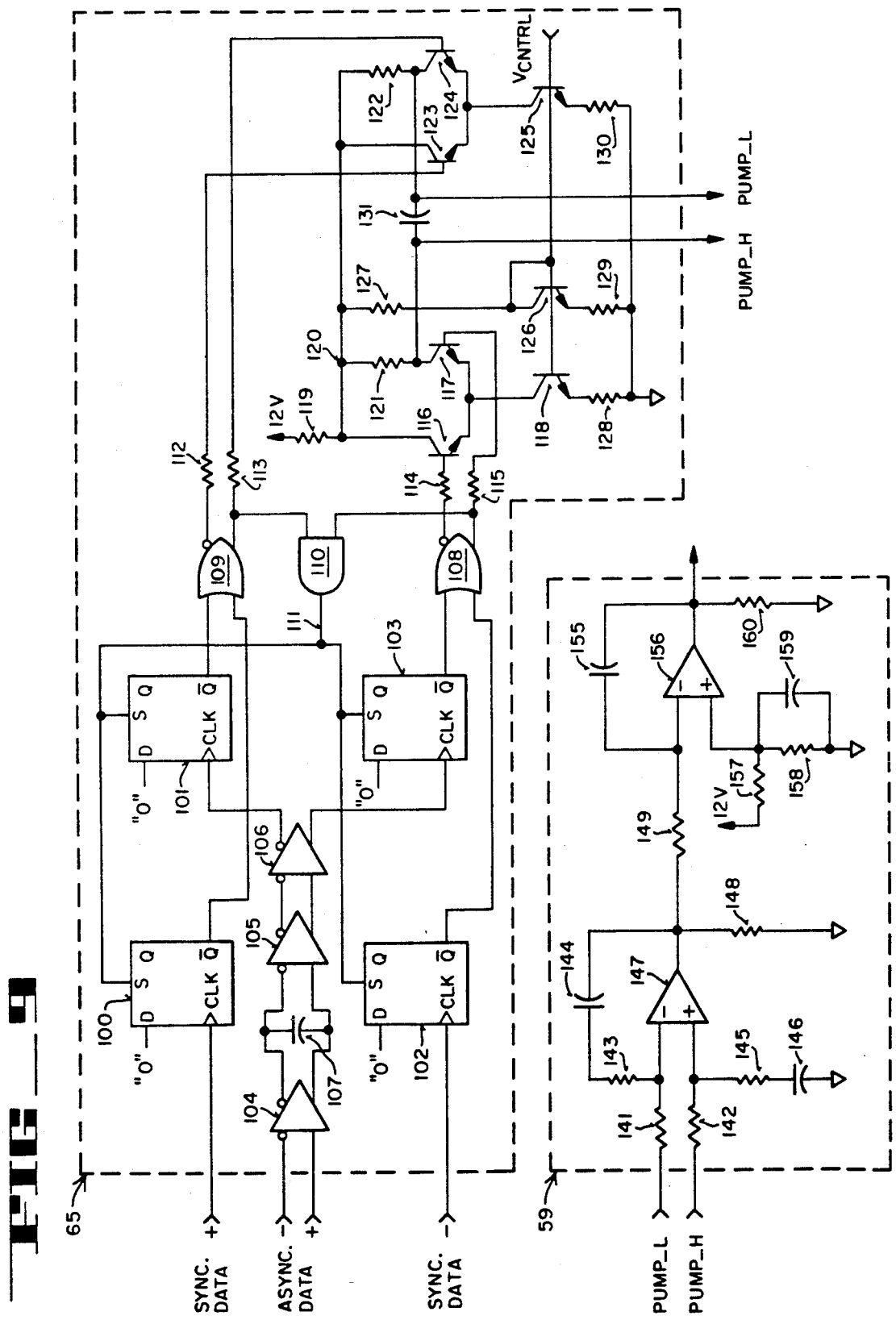
FIG_9

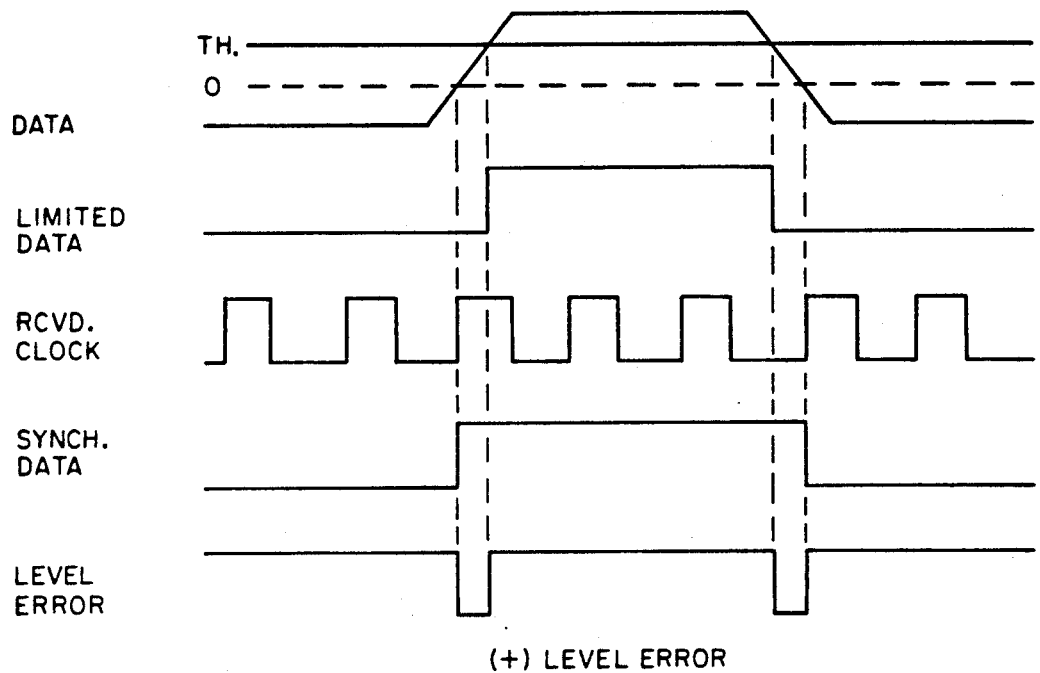
FIG_10A
(+) LEVEL ERROR
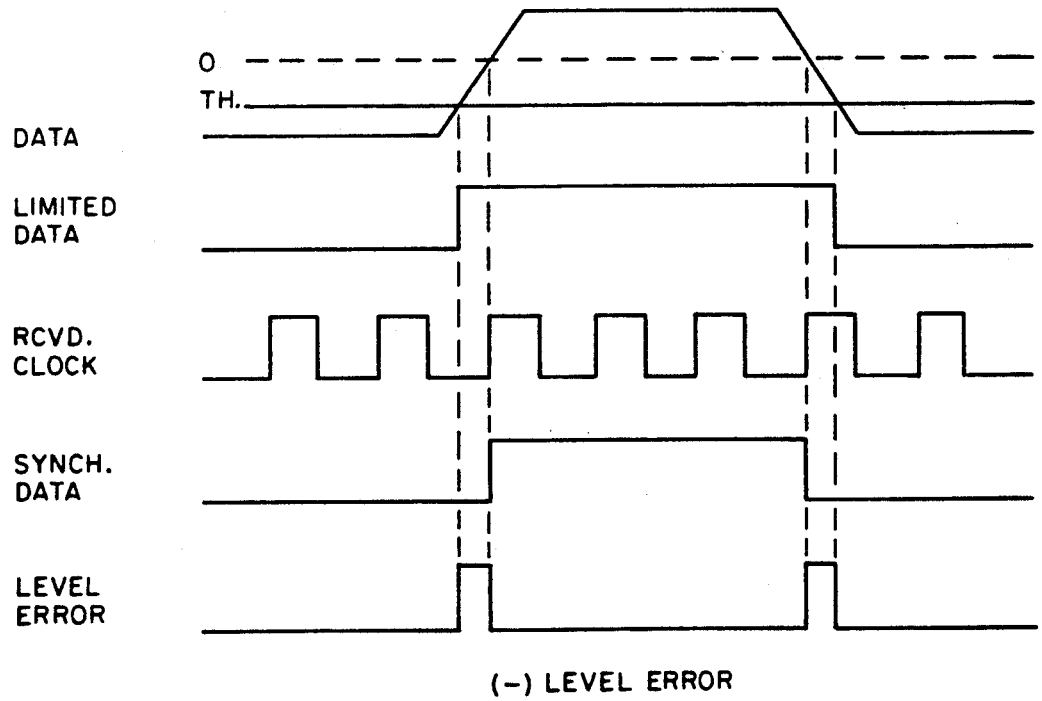
FIG_10B
(-) LEVEL ERROR

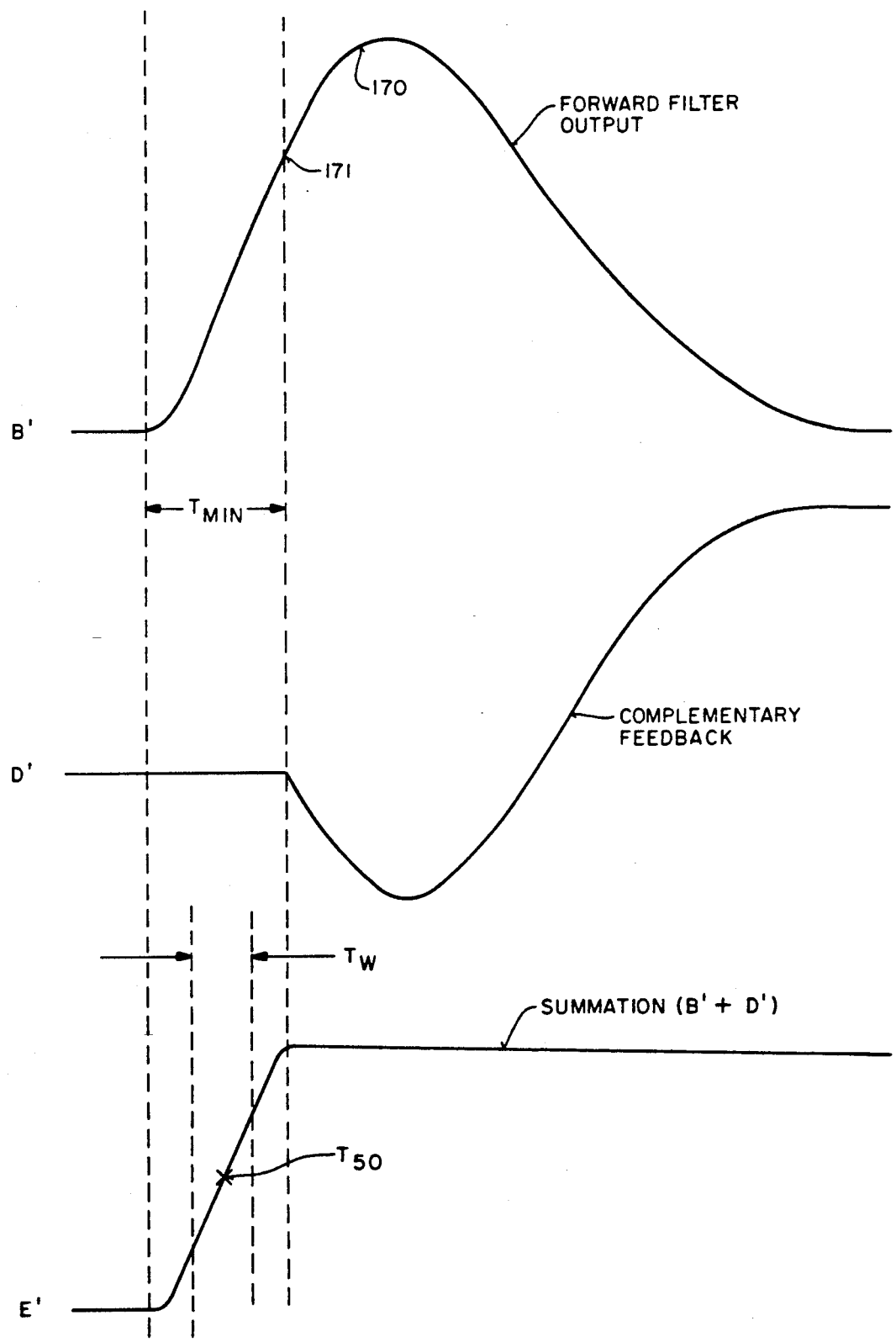

READ CHANNEL DETECTOR WITH IMPROVED SIGNALING SPEED

RELATED APPLICATIONS

This is a continuation-in-part (CIP) application of Ser. No. 301,515; filed Jan. 24, 1989 now U.S. Pat. No. 4,953,041; entitled "Read Channel Detector for Use in Digital Magnetic Recording Systems;" for which application is assigned to the assignee of the present invention.

FIELD OF THE INVENTION

This invention relates to the field of read channel detectors used for detecting and decoding read signals from mass storage media.

BACKGROUND OF THE INVENTION

In present day data processing systems, it is desired to provide a large amount of memory which can be accessed in a minimum amount of time. One type of memory which has enjoyed widespread use in the data processing field is that of magnetic media disk memories.

In general, disk memories are characterized by the use of one or more magnetic media disks stacked on a spindle assembly and rotating at a high rate of speed. Each disk is divided into a plurality of concentric "tracks" with each track being an addressable area of the memory array. The individual tracks are accessed through magnetic "heads" which fly over the disks on a thin layer of air. Typically, the disks are two-sided with a head accessing each side.

The heads are in substantial alignment and are mounted to an actuator motor which moves the heads from track to track during the reading and writing of information from the disks. The actuator motor may be a "voice coil" electrodynamic motor which has a coil moving within a permanent magnetic field, defining a cylindrical core.

Information is encoded on magnetic media disks as a series of binary bits indicating a "1" or a "0". These bits are encoded as the presence or absence of a magnetic flux reversal. The capacity of the storage disk is dependent on the number of flux reversals which can be accurately written onto and read from a magnetic media storage disk.

In present day technology, the magnetic flux reversals are written onto, and read from, the magnetic media through the use of thin film heads. As the magnetic head passes over the disk surface, the head differentiates the flux emanating from the media producing a series of Lorentzian pulses having alternating polarity. These isolated pulses are coupled to a read data channel which recovers the digital information recorded on the media.

In most conventional digital magnetic recording systems the readback (or playback) signal is differentiated in order to convert the waveform amplitude peaks into zero-crossings. An example of a read channel which uses peak detection as a means to recover data is described in section 2.4 of "Magnetic Recording Volume II: Computer Data Storage" authored by C. Dennis Mee and Eric D. Daniel. FIG. 2.39 of Mee and Daniel illustrates a differentiator-based peak detection data channel in block diagram form. In the channel of Mee and Daniel, the readback signal received from the head preamplifier is first equalized in order to achieve higher bit densities. A typical equalization filter uses pulse slimming filters to narrow both the leading and the trailing edges of the Lorentzian input pulse. Pulse slimming is generally achieved through the addition and subtraction of signal-derived compensation pulses. Following equalization, the readback signal is differentiated, limited and then inverted in order to fully recover the representative digital data.

Because of the demand for still higher bit densities, it is desirable to further narrow the time window (which defines a data bit) of signals read by the magnetic head so that more signals may be read in a given time and correspondingly greater information density may be achieved. This requires a substantial improvement in the read data channel electronics. Derivative and pulse/slimming equalizers generally attempt to narrow the time window by symmetrically narrowing or slimming the pulses. Pulse slimming, however, results in an increase in the bandwidth of the read pulses requiring a corresponding increase in the read system bandwidth. A larger bandwidth obviously introduces more noise into the system; consequently, the signal-to-noise ratio (SNR) of the channel is degraded. An increase in system noise frequently translates into large amounts of peak shift due to intersymbol interference. Peak shift causes significant reduction in the achievable window margin in magnetic media storage systems.

As will be seen, the present invention provides an efficient means of signal detection which increases the binary signaling speed capability while minimizing intersymbol interference and with degradation of timing error.

SUMMARY OF THE INVENTION

There is described a read channel data detection circuit for a magnetic recording system. The read channel detector is useful for the recovery of digital data from a readback waveform produced by a magnetic recording head. The circuit comprises a forward filter for time constraining the rising edge of each isolated input magnetic pulse received from the recording head in order to minimize timing errors. The forward filter also reduces bandwidth to maximize signal-to-noise ratio, thus producing an optimally shaped pulse which is characterized by a slimmed rising edge and a slurred falling edge. This optimally shaped pulse is input to a comparator which produces a step response when its input threshold is exceeded by the slimmed rising edge of the forward filter output. A quantized feedback filter is used to receive the step response output of the comparator and to produce a compensating waveform which is substantially complimentary to a portion of the waveform produced at the output of the forward filter. This complimentary waveform begins after the initial transition of the slimmed and slurred pulse, but preferably before the peak of the optimally shaped pulse occurs. The output of the quantized feedback filter is then fed back and summed with the output of the forward filter, producing an equalized signal which is substantially a step function. This equalized signal is then limited by the comparator to recover the digital data therein.

BRIEF DESCRIPTION OF THE DRAWINGS

The present invention is illustrated by way of example and not limitation in the figures of the accompanying drawings, in which like references indicate similar elements, and in which:

FIG. 1 is a simplified block diagram of the read detector circuit of the present invention.

FIG. 2a through e illustrates the waveforms produced at various nodes of the circuit shown in FIG. 1. In both FIG. 1 and FIG. 2, the waveforms and the corresponding nodes are denoted with capital letters.

FIG. 4 is a circuit schematic of the forward filter utilized in one embodiment of the present invention.

FIG. 5 is a circuit schematic of the quantized feedback filter utilized in the present invention.

FIG. 7a is the magnitude response curve of the forward filter circuit shown in FIG. 4.

FIG. 7b is the group delay response curve of the forward filter circuit shown in FIG. 4.

FIG. 8a is the magnitude response curve of the quantized feedback filter circuit shown in FIG. 5.

FIG. 8b is the group delay response curve of the quantized feedback filter circuit shown in FIG. 5.

FIG. 9 shows the schematic of the offset detector and offset loop compensator utilized in the present invention.

FIG. 10a is a timing diagram illustrating positive offset level error and the corresponding error signal produced by the offset detector of the present invention.

FIG. 10b is a timing diagram illustrating negative offset level error and the corresponding error signal produced by the offset detector of the present invention.

FIG. 11 illustrates the waveforms produced in various nodes of the circuit shown in FIG. 1 for the currently preferred embodiment. The waveforms of the FIG. 11 were generated in conjunction with the forward filter schematic of FIG. 12.

DETAILED DESCRIPTION OF THE INVENTION

Figure 3:
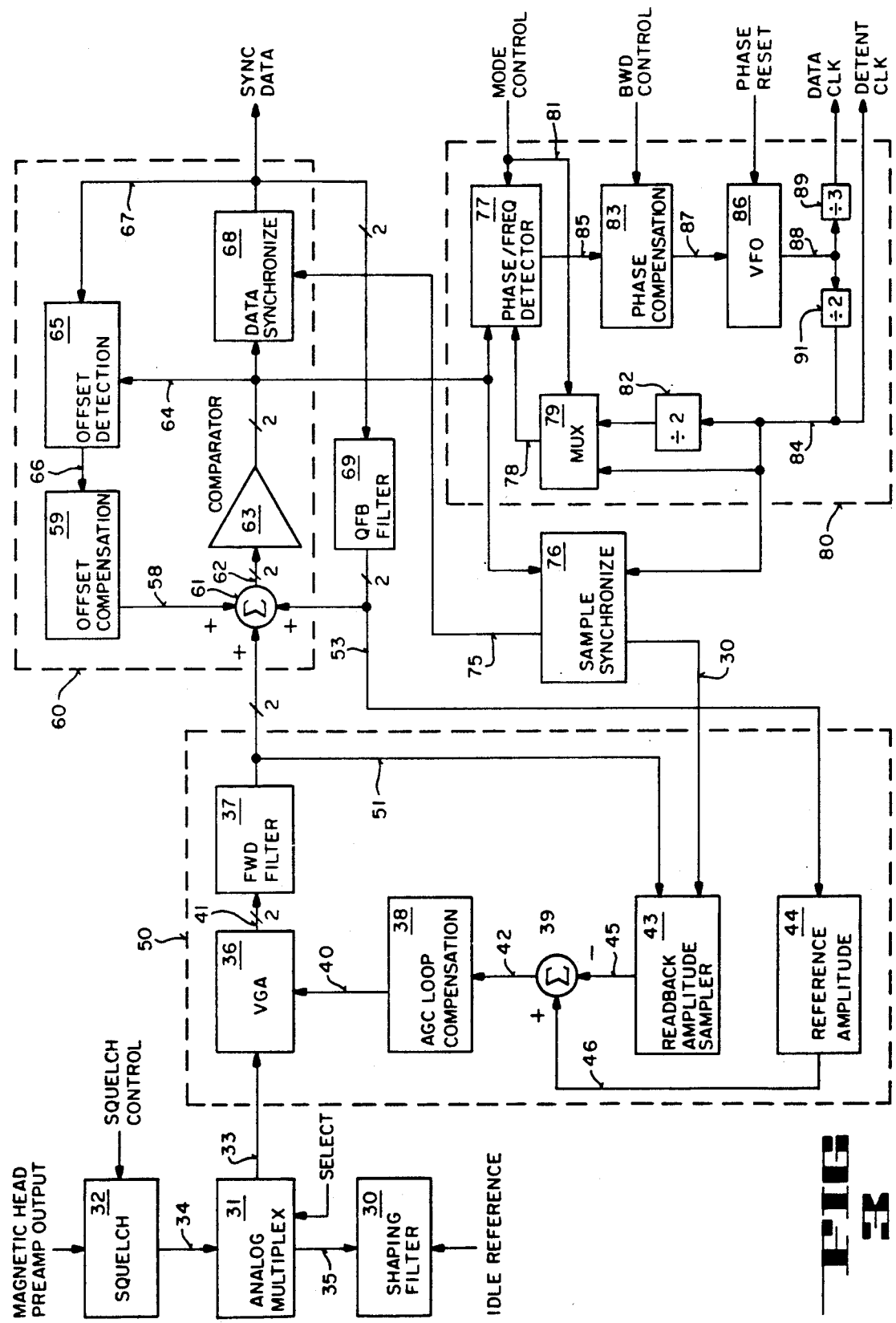
FIG. 3 shows a block diagram of the present invention as implemented in a hard-disk drive magnetic recording system.

A read channel detector employing quantized feedback techniques to increase the binary signalling speed capability, while minimizing intersymbol interference (ISI) in the reading of information from a magnetic media is described. In the following description, numerous specific details are set forth, such as device types, modulation codes, etc., in order to provide a more thorough understanding of the present invention. However, it will be obvious, to one skilled in the art, that the present invention may be practiced without these specific details. In other instances, well-known circuits have been shown in block diagram form in order not to unnecessarily obscure the present invention.

Referring to FIG. 1, a block diagram of the read detector of the present invention is shown. In its most basic form, the present invention comprises a forward filter 20, a summer 21, a comparator 22 and a quantized feedback (QFB) filter 23. During playback operation the magnetic recording head flies above the disk surface sensing the magnetic flux emanating from the disk media. The head differentiates that flux and provides a Lorentzian-shaped pulse to forward filter 20 along line 10. (A low-noise preamplifier is usually placed on the support arms used to hold the read/write heads.) An isolated Lorentzian pulse is shown in FIG. 2 as waveform A, and is representative of the pulse that is produced from the head media interface along line 10. Note that the capital letters denoting the waveforms of FIG. 2 correspond to the various nodes of FIG. 1 on which those waveforms may be found.

Forward filter 20 is used for pulse optimization (also referred to as equalization) of the isolated Lorentzian pulse. As configured, forward filter 20 acts to narrow the leading edge (slimming) and widen or extend (slurring) the trailing edge of the input waveform. To achieve this type of pulse shaping, filter 20 time constrains the rising edge of the isolated magnetic pulse which, correspondingly, minimizes timing errors. Bandwidth is also conserved to maximize the signal-to-noise ratio of the system. Reduction of the bandwidth of forward filter 20 causes the falling edge of the Lorentzian pulse to assume a drooped or slurred characteristic waveform shape. The result is that an optimally shaped waveform is produced on line 11—optimal in the sense of allowing an adequate rise time to minimize timing errors and intersymbol interference, while restricting the bandwidth to maximize signal-to-noise ratio. Thus, the output produced along line 11 of FIG. 1, and shown in FIG. 2 as waveform B, is characterized by a relatively fast rise time and a relatively slow fall time when compared to the input Lorentzian magnetic pulse. By optimizing the shape of the input readback waveform, higher bit densities may be achieved than are normally possible without this type of equalization.

As previously discussed, other prior art systems also use pulse slimming techniques. However, other prior art systems perform pulse slimming symmetrically; that is, both the leading and trailing edges of the input waveform are narrowed. The signal-to-noise ratio of the recording system after symmetrical equalization is degraded by the increase in noise power due to the high frequency boost. In those systems using a differentiator approach in the peak detection read channel, the differentiator also boosts the high frequency spectral components of noise resulting in substantial increases in noise induced time errors. Intersymbol interference also translates into peak shift which, when pulse slimming is inadequate, may cause a significant reduction in the achievable window margin in magnetic media storage systems.

Conversely, the present invention utilizes a forward filter 20 which time constrains only the leading edge of the input Lorentzian pulse while simultaneously reducing bandwidth. The result is an optimized waveform characterized by a slimmed rising edge and a slurred falling edge when compared to the input pulse. By time constraining the leading edge of the input magnetic pulse while reducing the effective bandwidth, a substantial reduction in intersymbol interference, as compared with symmetrical pulse slimming techniques, is realized.

In order to recover digital data from the readback pulses of alternating polarity, it is necessary to convert the analog input head pulse into a digital transition. Therefore, a desired readback response could be realized in FIG. 2 if waveform B remained at its maximum amplitude level (shown as line 18) after having reached its peak value (shown as occurring along dashed line 16). In other words, a desired response is that which would be attained with the slurred portion, or low-frequency signal component, of waveform B restored. Because the difference between the desired response and the actual response of the channel is negligible and begins after the initial transition has been detected, quantized feedback can be used to generate this difference signal locally. The difference signal, representing the compliment of the slurred portion of waveform B, is then added to the output of forward filter 20, thereby effectively equalizing the response. The basic principles and historical background of quantized feedback are generally discussed in "Synthesis of Active Networks", by W. R. Bennet, Proc. Polytech, Inst. Brooklyn Symp. Series, Vol. 5, *Modern Network Synthesis*, pp. 45-61, April 1955, herein incorporated by reference.

Referring again to FIG. 1, the output of forward filter 20 is produced on line 11 which is coupled to summer 21. The other input of summer 21 is provided along line 15 from the output of quantized feedback (QFB) filter 23. Summing network 21 has an output 12 which is coupled to the input of comparator 22. Comparator 22, in turn, has an output 13 for providing binary signals to a demodulator (not shown in FIG. 1), and a complimentary output 14, which forms a part of the quantized feedback loop. Line 14 is coupled to the input of quantized feedback filter 23.

In operation, the output of comparator 22 normally resides in either a logic "high" or a logic "low" level since QFB filter 23 acts to hold comparator 22 in a steady state under DC conditions. The read channel detector will remain in this steady state condition until an isolated pulse of opposite polarity (opposite to the last pulse transmitted) arrives from the recording head along line 10. When this occurs, the input Lorentzian pulse is slimmed and slurred by filter 20, as previously discussed. When the input threshold of comparator 22 is exceeded, comparator 22 will switch state. The threshold level is shown in waveform B of FIG. 2 as cross-hatch 17, while the inverted step output of comparator 22 is shown as waveform C. This inverted step response is coupled to the input of QFB filter 23 along line 14.

Generally, QFB filter 23 comprises a low-pass filter having a response complimentary to the slurred portion of waveform B. Details of the QFB filter utilized in the preferred embodiment will be discussed later. The compensating output of QFB filter 23 is shown as waveform D of FIG. 2. FIG. 1 shows this output being coupled to one of the two additive inputs of summer 21.

Summer 21 adds waveforms B and D of forward filter 20 and QFB filter 23, respectively, to produce waveform E which represents the desired readback response. Waveform E is characterized as being a band-limited step response whose rise time is adequate to prevent intersymbol interference. Waveform E is then input along line 12 to comparator 22 which produces a digital output on line 13 representing the digital information previously encoded on the magnetic media.

This technique of using quantized feedback equalization has been demonstrated to increase the binary signalling speed capability of the read channel without severe degradation of signal-to-noise ratio. Thus, the effective step response of the read channel is made sharper by controlling the shape of the step beyond the detection of the transition. Because the compensated waveform reaches steady state much earlier, the signalling speed is increased without severe intersymbol interference. Furthermore, because a correct present decision always depends on having made a correct past decision, error propagation is limited to 2-bits. For example, if an incorrect present decision is made (i.e., an error is produced due to noise or some other perturbation) the detector will make a premature transition—either positive or negative going. When the input pulse corresponding to the correct decision arrives, it will be ignored since the comparator has already switched state. However, the system will already be in the correct state to respond to the next transition of opposite polarity. Therefore, after the error has propagated two bits the present invention will be in the correct state to properly recognize the next bit.

Referring now to FIG. 3, the present invention is shown incorporated into a rigid-disk magnetic recording system. The magnetic head of preamplifier output signal is now shown being input into squelch block 32 which also receives a squelch control input signal. Squelch block 32 is used to inhibit signals developed at the head media interface during writing operations. During write operations, a large signal is produced by the preamplifier associated with the magnetic head. This signal must be inhibited from interfering with the idle reference frequency that the system is locked onto during write operations. When operating in read mode, squelch block 32 is turned off to provide a direct conductive path for the preamp output signal to analog multiplex unit 31 along line 34.

Analog multiplex 31 has a select input which is used to connect either the preamp output signal or the idle reference signal to automatic gain control (AGC) block k0 along line 33. The idle reference represents the recovered clock from the servo system and provides a means for tracking motor speed variations of the servo. By running the read channel circuitry, and particularly the phase-locked loop incorporated therein, at an idle reference frequency during the writing of data, switching transients are minimized. Minimizing the transients normally generated when switching between read and write operations reduces the total time required to produce valid data. The idle reference is input to multiplex 31 on line 35. Shaping filter 30 converts the received idle reference to a sine wave and eliminates high order harmonics.

AGC block 50 is an important element in the embodiment of FIG. 2. Because the system uses a constant amplitude step response feeding a summation network, the forward path needs some sort of magnitude gain control to insure that the amplitude output of the forward filter is properly matched to the feedback filter amplitude. AGC unit 50 performs this magnitude control on the forward filter response. AGC circuit 50 is also required to compensate for head-to-head and disk-to-disk tolerances, and also inside-track-to-outside-track amplitude tolerances.

AGC unit 50 comprises a variable gain amplifier (VGA) 36 coupled along line 41 to forward filter 37. Forward filter 37, which performs the pulse optimization previously discussed, is comprised of a modified ladder network achieving a non-minimum phase transfer function as illustrated in FIG. 4. In FIG. 4, the differential input from VGA 36 is first AC coupled through capacitors C1 and C2, thereby eliminating any DC component. Differential coupling has the beneficial effect of increasing the common mode rejection ratio of the system. The remaining components of forward filter 37 illustrated in FIG. 4 form a 6-pole ladder network with the combination of L3, C7 and L4, C8 providing an amplitude null to help sharpen the stopband rejection. Additionally, elements L1, C3 and L2, C4 provide some delay compensation to achieve the desired slimmed leading edge. The magnitude transmission response and group delay response curves characterizing forward filter 37 are shown in FIGS. 7a and 7b, respectively.

Referring once again to FIG. 3, the output of forward filter 37 is a differential signal produced on line 51. Line 51 is coupled to summer 61 and readback amplitude sampler 43. When comparator 63 detects a transition which exceeds its input threshold at the output of forward filter 37, it changes state. This transition is then detected by sample synchronizer 76 which is coupled to the comparator output via line 64. In response, sample synchronizer 76 produces a corresponding signal along line 30. Readback amplitude sampler 43 then performs a peak measurement of the output of forward filter 37. This measurement is used to determine the relative amplitude of the forward filter response as compared to the QFB output. Readback amplitude sampler 43 is implemented in the preferred embodiment using a simple sample and hold circuit.

The output of readback amplitude sampler 43 appears on line 45 as a subtracting input to summer 39. Summing network 39 compares the amplitude measurement of the forward filter response with the reference amplitude signal produced by reference amplitude block 44 on line 46. Reference amplitude block 44 uses the common mode voltage (also referred to as the average value differential signal) provided by quantized feedback filter 69 and scales it with an appropriate voltage divider network to produce the requisite reference amplitude signal. QFB filter 69 is coupled to reference amplitude block 44 along line 53. Reference amplitude block 44 is coupled to one input of summer 39 along line 46. Thus, summing network 39 creates an error signal on line 42 in response to the measured amplitude difference between the signals provided on lines 44 and 45, which is then coupled to AGC loop compensation network 38 on line 42. The control signal produced by network 38 causes a corresponding adjustment in the gain of VGA 36 so that the amplitude response of forward filter 37 is made to match that of QFB filter 69. The entire AGC loop, therefore, forces the error signal to zero making the sampled readback amplitude of the forward filter equal in magnitude to the reference voltage value. This operation preserves the amplitude match at the inputs 51 and 53 of summer 61.

As the read waveform is processed through the read data channel of the present invention, the presence or absence of a transition within each signalling element is detected using a variable frequency clock. The available time window for detection, called the data bit cell or detent time, is completely determined by the rate of the modulation code used.

A modulation code for magnetic recording is a one-to-one mapping of binary data into a constrained binary sequence, which is then recorded onto a magnetic recording medium in the form of a NRZI (modified non-returned-to-zero) waveform. In this waveform, the maximum and minimum spaces between consecutive transitions correspond to the maximum and minimum run lengths of zeros between two consecutive ones in the corresponding binary sequence. Thus, the modulation codes for magnetic recording fall into the class of run-length-limited (RLL) codes. These codes are characterized by the code parameters (d,k) where d represents the minimum and k represents the maximum number of zeros between two consecutive ones in the coded sequence. The parameter d controls the highest transition density in the resulting intersymbol interference. The parameter k controls the lowest transition density and insures adequate frequency of transitions for synchronization of a read clock. The rate of the code is written as the ratio m/n, where m represents the number of data bits mapped into n binary digits in the coded sequence. An RLL code is completely described by its rate and code parameters (written as m/n(d,k)). To achieve maximum lineal density, the preferred embodiment of the present invention uses the RLL modulation code 2/3 (1,7).

Summer 61 performs the linear addition of the signals appearing on lines 51, 53 and 58, producing an output on line 62, which is then input into comparator 63. Comparator 63 may be comprised of any commercially available comparator, such as the VC7695. The output of comparator 63 is a differential signal produced on line 64 which is connected to data synchronizer 68, offset detector 65, sample synchronizer 76 and phase-/frequency detector 77. Because of disk-velocity perturbations, the read clock frequency is not always constant. Therefore, the read clock is recovered from the recorded signal in the present invention using a variable frequency oscillator (VFO) and phase-locked-loop (PLL). Both the VCO and PLL are contained within automatic phase control (APC) loop 80.

APC loop 80 has as its input, the asynchronous data output from the comparator produced on line 64. This asynchronous output is initially received by phase/frequency detector 77. Detector 77 produces an error signal corresponding to the phase and frequency difference between the present read clock and the asynchronous data. The error signal produced on line 85 drives phase compensation network 83. Phase compensator 83 converts the error signal of line 85 to a control voltage on line 87. This control voltage is input to variable frequency oscillator (VFO) 86 and controls the frequency of VFO 86. VFO 86 produces an output frequency on line 88 which is subsequently divided by divider 91. The output of divider 91 appears on line 84 and represents the detent clock of the system. This detent clock signal is coupled to sample synchronizer 76 and to MUX 79, either directly or through divider 82. Line 78 connects MUX 79 to phase/frequency detector 77 to complete the feedback loop. Loop stability is reached when the frequency and phase components of the input signals appearing on line 64 and 78 are identically coincident in time. The entire APC loop is a third-order loop which in steady state forces the time coincidence to zero.

Frequency divider 89 is a divide-by-3 network which takes the frequency appearing on line 88 and divides it by 3, producing a data clock output which is then coupled to the modulation decoder circuit. The use of divide by 2 and divide by 3 networks is consistent with the particular RLL modulation code (2/3 (1,7)) used in the present invention. This detent clock, representing the bit cell time for the undecoded digital waveform, is produced on line 84 at the output of divide-by-2 network 91. For the 2/3 (1,7) code the minimum time between transitions is two detents. This detent clock is also output to the modulation decoder circuit (not shown in FIG. 3).

APC unit 80 can operate in either an idle reference state or a readback state. To insure proper lockup at preamble, MUX 79 selects the feedback path which includes divide-by-two network 82. Divide-by-two circuit 82 insures that the clock signal feedback to detector 77 has the same period as the detent cell time, not two detent cell times as is provided on line 84. When divider 82 is selected, detector 77 is sensitive to both phase and frequency differences along lines 64 and 78. Mode control is provided to detector 77 and MUX 79 along line 81. Mode control is high during idling and during the preamble portion of readback operations. (Mode control high corresponds to the feedback path, which includes divider 82 being selected by MUX 79). Mode control transitions low at the beginning of the data portion of the readback signal. At that point, divider 82 is deselected by MUX 79 and the detent clock signal is coupled directly to detector 77 via line 78. With mode control low, detector 77 detects only phase differences and not frequency differences.

Sample synchronizer 76 receives the detent clock along line 84 and passes that clock (representing the recovered clock rate) to data synchronizer 68 via line 75. Essentially, data synchronizer 68 comprises a JK type flip-flop (with some additional logic elements) that receives the asynchronous data from comparator 63 and assigns the occurrence of a transition to a window cell of the concurrent recovery clock. The synchronized or clocked data is produced along line 67, which is a differential signal connected to offset detector 65 and QFB filter 69.

Referring now to FIG. 5, the detailed circuit schematic of QFB filter 69 is shown. Filter 69 is a fully balanced differential ladder network, modified to achieve a non-minimum phase transfer function, and comprises resistors R3 through R6, inductors L7 through L10 and capacitors C10 through C12. The filter is a fourth-order network which provides enough degrees of freedom to make the complimentary waveform match the trailing edge of the forward filter output. The transmission magnitude response and group delay response which characterizes quantize feedback filter 69 is shown in FIGS. 8a and 8b, respectively.

With reference again to FIG. 3, the read channel detector of the present invention also includes automatic offset control (AOC) loop 60 for correcting temperature dependent and time dependent offset errors normally produced by differential amplifiers and electronic circuits. Without AOC loop 60, offset errors would introduce timing errors, commonly referred to as pulse pairing errors, which may cause intersymbol interference (ISI). For example, a positive voltage offset error would lead comparator 63 to switch later on the rising edge and earlier on the falling edge of the input data pulse than it would under normal conditions. The limited data would then have a time occurrence that is paired inward. Conversely, if the level is offset too low, the limited data pairs outwardly. AOC loop 60, therefore is designed to force the total offset error to zero.

AOC loop 60 includes an offset detector 65 which is comprised of ordinary digital logic circuits. Detector 65 receives asynchronous data along line 64 and synchronous data along line 67. From these two signals, detector 65 creates an error signal on line 66 which is input into offset compensation network 59. Network 59 comprises a series of operational amplifiers, resistors and capacitors which provide correct compensation for loop stability. The compensation network feeds back the offset correction voltage along line 58 into summing network 61.

FIG. 9 shows the offset detector means 65 and offset compensation means 59 for the system of FIG. 3. Offset detector 65 comprises a pair of phase detectors coupled to a charge pump which then supplies current to the compensation network to produce an offset voltage.

This offset voltage is input to summing node 61. The first phase detector includes D flip-flops 100 and 102 for receiving the positive and negative synchronous data outputs respectively, of synchronizer 68. The synchronous data lines are coupled directly to the clock inputs of D flip-flops 101 and 103.

Asynchronous data from comparator 63 is also input to detector 65. After the asynchronous data arrives, it is delayed by the network comprising invertors 104-106 and capacitor 107. Capacitor 107 is used to adjust the delay so as to approximately match the signal delay through data synchronizer 68. By delaying the asynchronous data in this manner, the asynchronous and synchronous data transitions are presented to the clock inputs of flip-flops 100-103 at about the same time.

The inputs to each of the D flip-flops are either left open or are directly coupled to ground potential. This provides a logical "0" to each D-input. The $\overline{Q}$ of D flip-flops 100 and 101 are coupled to OR gate 109, while the $\overline{Q}$ outputs of D flip-flops 102 and 103 are coupled to OR gate 108. The non-inverting outputs of OR gates 108 and 109, in turn, are coupled to the inputs of AND gate 110. The output of AND gate 110 is coupled along line 111 to the "set" input pin of each of the D flip-flops. Thus, the phase detector arrangement described acts to sense phase differences between the asynchronous and synchronous data pulses. Such phase differences are normally manifested by voltage level offset differences. (It should be noted that logic elements 100-110 typically comprise fast switching ECL-type logic gates. For example, D flip-flops 100-103 preferably comprise part number MC10H131, manufactured by Motorola.)

In order to better illustrate the operation of offset detector 65, assume that positive level error is introduced into the automatic offset control loop. Flip-flops 100-103 will initially be in a "set" condition, i.e., Q output is high while $\overline{Q}$ is low. Upon the first rising edge of the next synchronous data pulse, flip-flop 100 will be clocked, thereby switching $\overline{Q}$ output high. This transition forces the non-inverting output of OR gate 109 (as well as the input to AND gate 110) high. OR gate 109 will remain high until the corresponding rising edge of the asynchronous data arrives at the input of offset detector means 65. Eventually, the asynchronous data pulse will clock flip-flop 103, thereby switching its $\overline{Q}$ output high. This high output is then coupled through OR gate 108 to the second input of AND gate 109.

When both inputs are high, AND gate 110 outputs a logical "1" along line 111. This, in turn, forces the "set" pin on flip-flops 100-103 high. Simultaneous setting of flip-flops 100-103 returns the phase detectors to their initial state, i.e., all $\overline{Q}$ outputs low. Therefore, the non-inverting outputs of OR gates 108 and 109 are driven high only when a phase difference has been detected between asynchronous and synchronous data. The time they remain high is directly related to the magnitude of the error detected. Thus, the outputs produced by gates 108,109 corresponds to the level error signal of the loop.

The differential outputs of OR gates 108 and 109 are shown in FIG. 9 coupled to the differential amplifiers of the charge pump section comprising transistors 116, 117 and 123, 124, respectively. Resistors 112-115 are used to limit the current output of OR gates 108 and 109. Bias currents for the differential pairs are provided by the bias network which includes transistors 118, 125, 126 and resistors 127-130. Bias control voltage $V_{CNTR}$ provides the needed operating potential for transistors 118, 125 and 126. Resistor 119, coupled between a 12-volt supply potential and node 120, produces a voltage drop so that node 120 is at approximately 8.1 volts in the currently preferred embodiment.

To illustrate the operation of the charge pump section of detector 65, consider once again the example given above. Initially, the non-inverting outputs of OR gates 108 and 109 are low while the inverting outputs are high. Current will therefore flow through transistors 123 and 116 while transistors 117 and 124 will basically be off with little or no current flow. This causes both the Pump-H and Pump-L terminals of capacitor 31 to be at the same potential; namely, the potential of node 120 (approximately 8-volts). When the above described phase difference is detected, OR gate 109 switches state turning on transistor 124 and switching off transistor 123. This results in a voltage drop across resistor 122 and also across the terminals of capacitor 131 (representing the Pump_H and Pump_L outputs). Current, or charge transfer, is provided to the Pump_H and Pump_L outputs of the charge pump according to the well-known relationship: $I = CdV/dt$.

The Pump_H and Pump_L outputs of detector 65 are coupled to the input of offset compensation means 59 as shown in FIG. 9. The compensation network 59 basically converts the differential inputs to a voltage offset which then forces the phase difference between synchronous and asynchronous data inputs to be zero.

The compensation network comprises a low pass/emphasis filter including amplifier 147, capacitors 144, 146 and resistors 141–143, 145 and 148. Level lock loop gain control is set by the value of resistor 149. The second stage of the compensation network consists of an integrator including amplifier 156, feedback capacitor 155, resistors 157, 158, 160 and capacitor 159.

FIGS. 10a and 10b are timing diagrams illustrating positive and negative offset level errors, respectively, and the corresponding error signal produced by the offset detector of the present invention. Referring to FIG. 10a, data is shown having a positive level error, such that the threshold is exceeded after zero-crossing. This produces a limited data pulse which is reduced inward as compared to the synchronized data. (The synchronized data is synchronized to the recovered clock). Thus, the level error generated and provided at the input of summer 61, acts to correct the difference between the limited or asynchronous, data and the synchronous data. Similarly, FIG. 10b shows data having negative level error such that the threshold is exceed before the zero-crossing. This causes the limited data pulse to extend outward when compared to the synchronous data. The resulting level error is a positive pulse pair which then corrects for this discrepancy.

Figure 6:
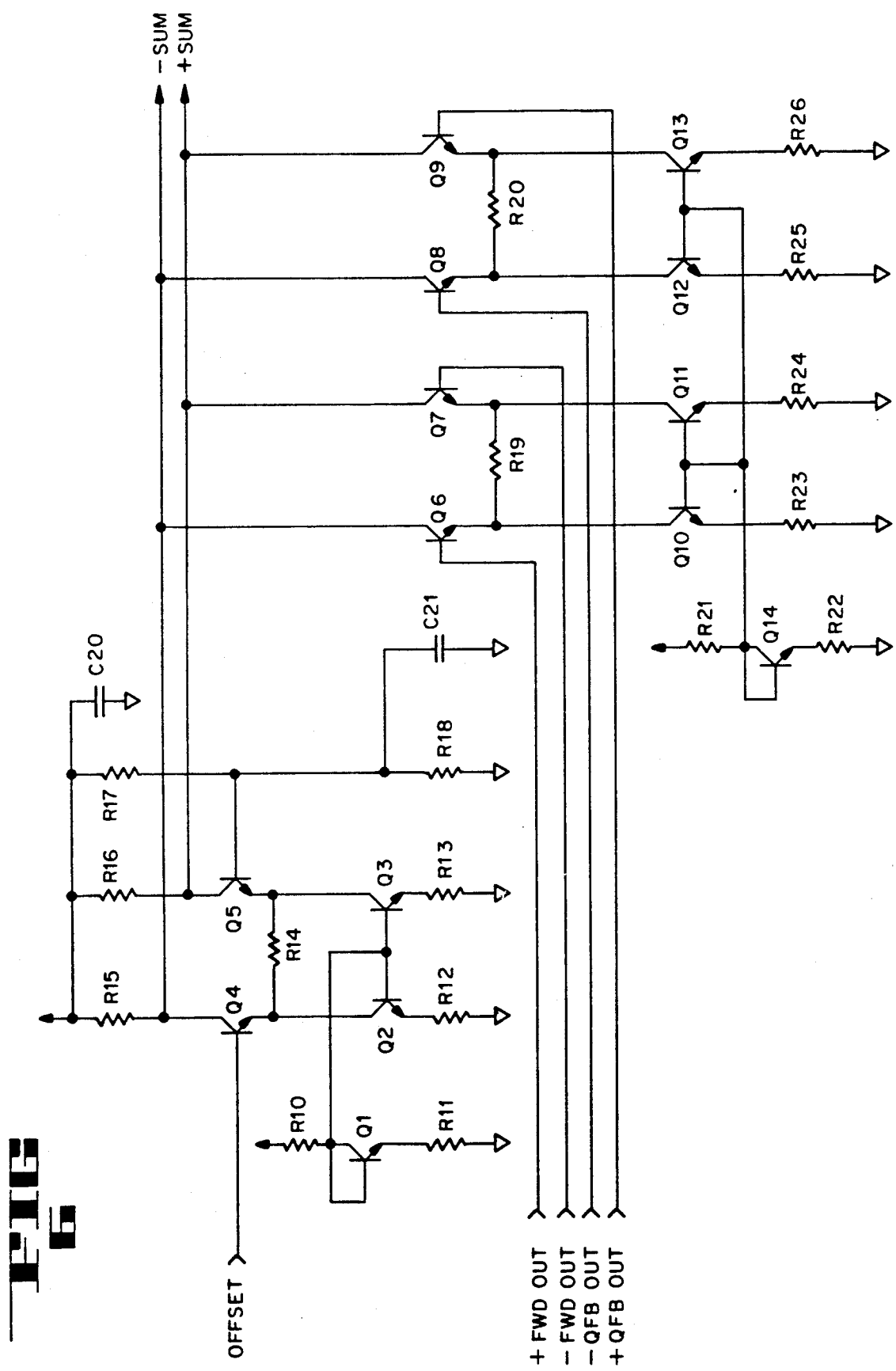
FIG. 6 is a schematic of the summing network utilized in the present invention.

Referring now to FIG. 6, a circuit schematic of summing network 61 is shown. The positive and negative forward filter outputs are coupled to the bases of transistors Q6 and Q7, respectively, while the negative and positive QFB outputs are coupled to the bases of transistors Q8 and Q9, respectively. (All transistors shown in FIG. 6 are ordinary NPN transistors.) Transistors Q6 and Q7 are part of a current mirror which also includes transistors Q10, Q11 and resistors R23, R24 and R19. Similarly, the current mirror associated with transistors Q8 and Q9 includes transistors Q12, Q13 and resistors R25, R26 and R20. The bias voltage for transistors Q10 through Q13 is provided by Q14 and resistors R21 and R22. These differential current mirrors are coupled to summing nodes −SUM and +SUM.

Offset compensation is provided at the base input of transistor Q4 in FIG. 6. Transistors Q1 through Q5 and resistors R10 through R18 comprise a third differential current mirror. Because each of the current mirrors of FIG. 6 is coupled to the same pair of summing nodes, an additive effect is achieved. Thus, the signal appearing at the input of comparator 63 represents the linear sum of the outputs of the forward filter, the quantized feedback filter and the automatic offset control loop.

DISCUSSION OF THE EMBODIMENT OF FIGS. 11 AND 12

As previously discussed in conjunction with of FIG. 2, forward filter 20 operates to time constraint (i.e. slim) the leading edge of the input Lorentzian pulse (waveform a of FIG. 2) and slur the falling or trailing edge. The output of forward filter 20 is shown as waveform B in FIG. 2. Waveform B is slimmed such that the 0–100% rise time represents the systems $T_{min}$, the period of the highest frequency written waveform ($T_{min} = m/n(d+1)T$; where $T$ = data period = 1/data rate). In other words, the filter circuit of FIG. 4 forces (with slimming) a linear equalization from zero-to-peak in $T_{min}$.

As it turns out, the signaling speed and timing error degradation due to noise is further improved for the present invention if the leading edge of the Lorentzian pulse is slimmed less strictly. That is, if the zero-to-peak time is allowed to be longer, then the slope of the leading edge is lowered, which brings about a corresponding reduction in timing error degradation. To achieve high lineal densities and yet make the waveform after equalization have the same high resolution, the slimming may stop short of the Lorentzian peak. This means that the complementary waveform generated by QFB network 23 begins earlier in time. This concept is illustrated in FIG. 11.

FIG. 11 shows waveforms B', D' and E', which are analogous to waveforms B, D and E of FIG. 2. Waveform B' is the forward equalized filter output generated by the filter circuit of FIG. 12. Note that the leading edge is still time constrained, but not as severely as compared to that of waveform B of FIG. 2. In FIG. 2, waveform B has a leading edge which is time constrained within $T_{min}$. In contrast, for waveform B', the time period $T_{min}$ ends at point 171 on the leading edge of the forward filter output waveform. Point 171 occurs before the peak is reached at 170. Thus, while the leading edge is still time constrained, the zero-to-peak time is allowed to be longer, thereby reducing the slope.

The basic idea behind the embodiment of FIG. 11 rests upon the fact that slimming factor S is directly related to timing error degradation due to noise within the system. The slimming factor, S, can be represented mathematically by the equation $$S = T_{min}/T_{50}$$

where $T_{50}$ is a measure of the half amplitude of the pulse width of the Lorentzian input pulse. Whenever $T_{min}$ is small when compared to $T_{50}$, S gets small—with a corresponding increase in timing error degradation. Normally, disk drives operating with differentiator-based read channel detectors work at approximately 0.9 slimming and exhibit a degradation factor of approximately 2. Rather than suffer a higher timing degradation due to a leading edge which is time constrained within $T_{min}$, in the embodiment of FIG. 11 the slope of the leading edge of waveform B' is lowered, thus further minimizing timing error due to noise. Therefore, the advantage of the optimized equalization scheme of FIG. 11 is an improved binary signaling speed with less timing error degradation relative to waveform B of FIG. 2. Of course, improved signaling speed and a lower timing error translates into a minimized intersymbol interference.

In FIG. 11, waveform D' represents the complementary feedback waveform produced by the quantized feedback network for summation with waveform B'. Note that equalization begins when the rise time = $T_{min}$; that is, when the forward filter output waveform B' rises to point 171. Essentially, the equalization process performed by the quantized feedback network cancels the top of waveform B' by moving forward earlier in time to do the computation process. Thus, waveform D' begins with an undershoot followed by a rising response which substantially complements the remainder of waveform B'. To accomplish this, QFB filter 23 has its delays readjusted such that less delay is used to realize waveform D'.

Finally, waveform E' represents the summation of waveforms B' and D' for representing the desired, fully equalized response. Note that the rising edge is confined within time period $T_{min}$, which is larger than clock window $T_w$ and which is centered about the half amplitude point $T_{50}$. The slope of the rising edge of waveform E' is exactly the same as the slope of the rising edge of waveform B' up to point 171. After $T_{min}$, the response is largely flat so that waveform E resembles the desired step response.

Figure 12:
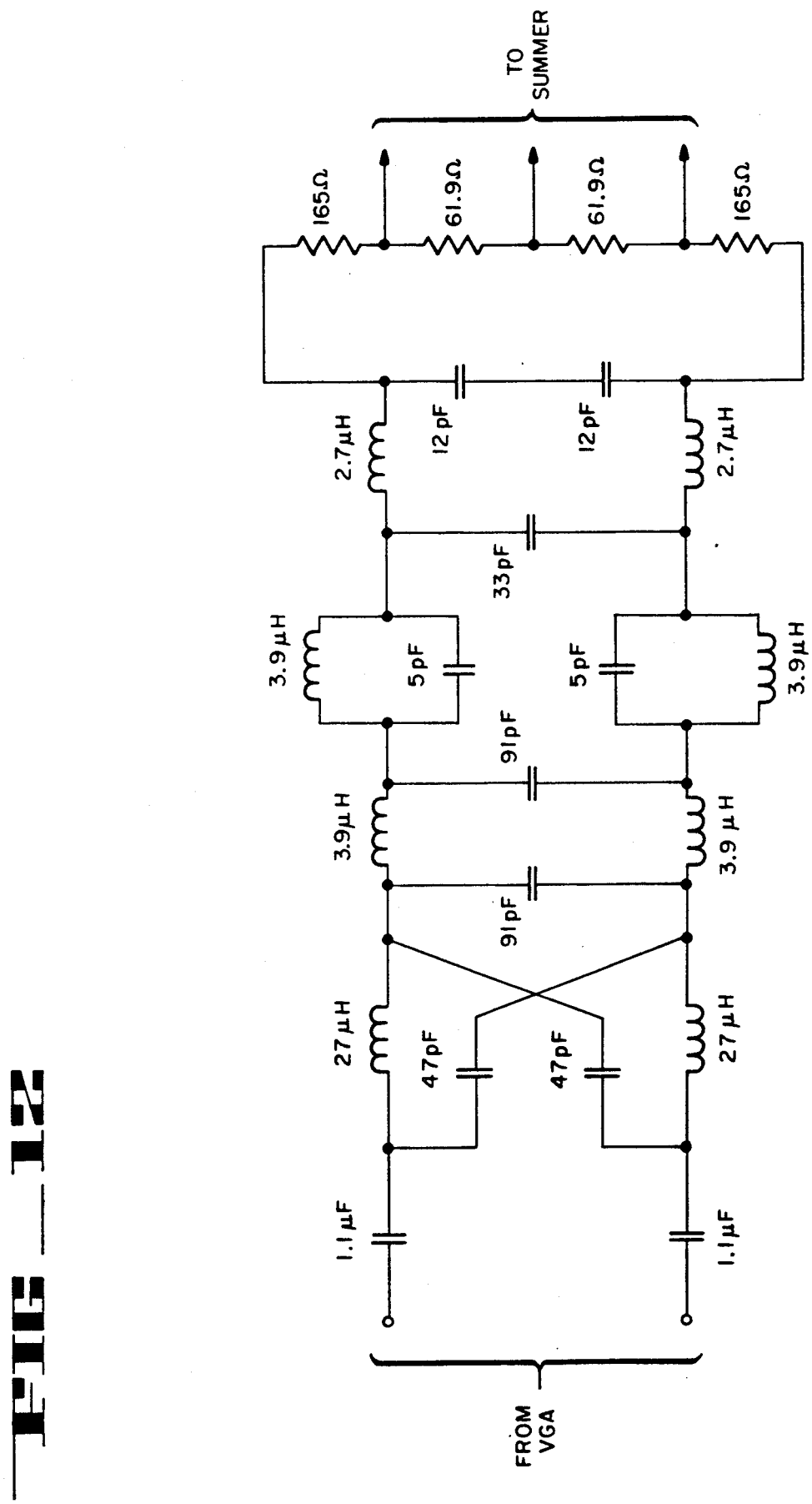
FIG. 12 is a circuit schematic of the forward filter utilized in the currently preferred embodiment of the present invention.

FIG. 12 illustrates the forward filter circuit schematic employed in the present invention for generation of waveform B'. Values for each of the elements illustrated in FIG. 12 are shown for the currently preferred embodiment.

It should be understood, of course, that the foregoing disclosure relates only to one particular embodiment of the present invention and that numerous modifications may be made without departing from the nature and scope of the present invention. It should also be understood that the terms and expressions which have been employed here are used as terms of description and not of limitation, and there is no intention, in the use of such terms and expressions, of excluding equivalents of the features shown and described, or portions thereof; it being recognized that various modifications are possible within the scope of the invention claimed.

Thus, a read channel detection circuit for use in a magnetic recording system has been disclosed.

I claim:

1. In a magnetic recording system, a read channel detection circuit for recovery of digital data from a readback waveform produced by a magnetic recording head, said circuit comprising:

a forward filter means for time constraining the leading edge of an isolated magnetic pulse and for reducing bandwidth, said forward filter means producing and optimally shaped pulse having a slimmed leading edge and, as a consequence of bandwidth reduction, a slurred trailing edge as compared to said input pulse, said slimmed leading edge being time constrained within a time interval which is longer than $T_{min}$, the period of the highest frequency written waveform;

a comparator means for producing a step response output in response to an equalized input signal;

a quantized feedback filter means for receiving said step response output and for producing a compensating waveform therefrom, said compensating waveform being substantially complementary to the portion of said optimally shaped pulse which occurs $T_{min}$ after the initial transition of said optimally shaped pulse; and a summing means for summing said compensating waveform and said optimally shaped pulse so as to produce said equalized input signal for input to said comparator means such that the binary signaling speed capability of said circuit is increased and timing error degradation due to noise is decreased.

2. The circuit of claim 1 wherein the peak of said optimally shaped pulse occurs $T_{min}$, and said compensating waveform begins $T_{min}$, after said initial transition of said optimally shaped pulse.

3. In a magnetic recording system, a method of recovering digital data from a series of isolated magnetic pulses generated by a magnetic recording head passing over an encoded magnetic media comprising the steps of:

time constraining the leading edge of a magnetic pulse received from the magnetic recording head while reducing bandwidth, thereby producing an optimally shaped pulse having a slimmed leading edge and a slurred trailing edge as compared to said magnetic pulse;

generating a step response signal when said slimmed leading edge exceeds a certain threshold;

producing a compensating waveform from said step response signal, said compensating waveform being substantially complementary to the portion of said optimally shaped pulse which occurs $T_{min}$, the period of the highest frequency written waveform, after the initial transition of said optimally shaped pulse;

summing said optimally shaped pulse and said compensating waveform to produce an equalized signal which represents either a positive-going or negative-going transition of said data.

4. The method of claim 3 wherein the time from said initial transition to the peak of said optimally shaped pulse is longer than $T_{min}$.

* * * * *